(12) United States Patent
Bandou et al.

(10) Patent No.: US 6,547,339 B2
(45) Date of Patent: Apr. 15, 2003

(54) WHEEL HAVING ROTATING BODIES

(75) Inventors: Kazuo Bandou, Kanagawa-ken (JP); Akitoshi Fukuda, Kanagawa-ken (JP)

(73) Assignee: Kanto Auto Works, Ltd., Yokosuka (JP)

( * ) Notice: Subject to any disclaimer, the term of this patent is extended or adjusted under 35 U.S.C. 154(b) by 0 days.

(21) Appl. No.: 09/933,848

(22) Filed: Aug. 21, 2001

(65) Prior Publication Data

US 2002/0024250 A1 Feb. 28, 2002

(30) Foreign Application Priority Data

Aug. 22, 2000 (JP) ........................................ 2000-250857
Jul. 24, 2001 (JP) ........................................ 2000-222548

(51) Int. Cl.[7] .............................................. B60B 1/00
(52) U.S. Cl. .......................... 301/5.23; 301/7.3; 180/7.2
(58) Field of Search ................................ 301/5.23, 5.3, 301/5.1, 1; 180/7.2, 20

(56) References Cited

U.S. PATENT DOCUMENTS

| 1,089,020 | A | * | 3/1914 | Swinehart | 152/394 |
|---|---|---|---|---|---|
| 1,687,330 | A | * | 10/1928 | Fitch | 152/394 |
| 1,690,240 | A | * | 11/1928 | Norcross | 152/394 |
| 2,083,766 | A | * | 6/1937 | Wittkopp | 152/379.3 |
| 4,715,460 | A | * | 12/1987 | Smith | 180/7.1 |
| 5,246,238 | A | * | 9/1993 | Brown | 280/11.204 |
| 5,733,015 | A | * | 3/1998 | Demarest et al. | 152/312 |
| 6,036,278 | A | * | 3/2000 | Boyer | 152/323 |
| 6,340,065 | B1 | * | 1/2002 | Harris | 180/7.2 |

FOREIGN PATENT DOCUMENTS

| CA | 2192566 | * | 7/1997 |
|---|---|---|---|
| JP | 7-12829 | | 6/1990 |
| JP | 10-500049 | | 12/1995 |
| JP | 11-227404 | | 8/1999 |

* cited by examiner

Primary Examiner—S. Joseph Morano
Assistant Examiner—Frantz F. Jules
(74) Attorney, Agent, or Firm—Hoffman & Baron, LLP

(57) ABSTRACT

A plurality of rotating bodies rotated in the direction orthogonal to the straight-forward direction of a wheel are disposed around the wheel in the wheel having rotating bodies provided with non-turning type rotating bodies. Each rotating body is rotatably supported around the axis of rotation across the radial direction around an axle, and each rotating body is formed in a shape in which an arc of the outer circumferential circle of the wheel is formed by a circumferential surface with the diameter of a tip portion smaller than the diameter of a base end portion. As a result, generation of a space between the rotating bodies can be suppressed.

11 Claims, 4 Drawing Sheets

FIG. 6A
FIG. 6B
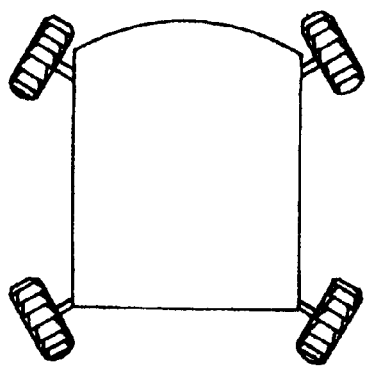
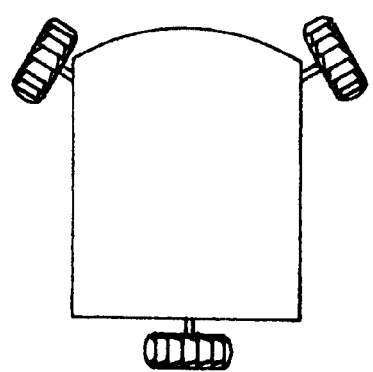

WHEEL HAVING ROTATING BODIES

BACKGROUND OF THE INVENTION

1. Field of the Invention

The present invention relates to a wheel having rotating bodies in which a plurality of non-turning type rotating bodies to be rotated in a direction orthogonal to the straight-forward direction of the wheel are disposed around the wheel for changing the advancing direction.

2. Description of the Related Art

Regarding the wheel having the rotating bodies, the wheel in which roller-like rotating bodies to be rotated in the direction orthogonal to the straight-forward direction are disposed on a rotary shaft along an outer circumferential circle of the wheel, and a buffer member is disposed between the rotating bodies is disclosed in Japanese Unexamined Patent Application Publication No. 11-227404. In addition, the wheel having a large number of spindle-like rotating bodies disposed in an inclined manner to the straight-forward direction under the assumption that drive wheels are provided is disclosed in Japanese Examined Patent Application Publication No. 7-12829 or Japanese Patent Publication No. 10-500049 (by PCT Application).

By using the former wheel, the wheel can be traveled in the transverse direction or diagonally while the wheel is rotated according to the vector component by the rotating bodies for shifting course without any turn different from a caster, i.e., without increasing the width of the wheel; however, a space is essentially generated between forward and rear ends of the adjacent rotating bodies with the width corresponding to the diameter of the rotating bodies. Thus, the buffer member is interposed in the space since stones or the like are caught therein; however, there leaves a room for improvement in that a frictional resistance with the rotating bodies is generated, and the rotating bodies cannot be rotated smoothly by the non-rotation.

On the other hand, by using the latter wheel, the wheel can be similarly traveled in the transverse direction or diagonally without any turn by the diagonal rotating bodies for shifting course; however, a space is generated between the adjacent circumferential surfaces of the rotating bodies, and if the diameter of the wheel is increased and the width in the longitudinal direction of each rotating body in the straight-forward direction is suitably increased considering the ride-over of a step, the transverse width of the wheel, i.e., the radius of turn of the wheel is naturally increased by the rotating bodies in the diagonal arrangement.

SUMMARY OF THE INVENTION

Accordingly, it is an object of the present invention to provide a wheel having rotating bodies which is provided with non-turning type rotating bodies to suppress generation of a space between the rotating bodies.

In the present invention, each rotating body rotated in the direction orthogonal to the straight-forward direction of the wheel is rotatably supported around the axis of rotation across the radial direction around an axle, and each rotating body is formed in a shape that the diameter of a tip portion thereof is smaller than the diameter of a base end portion, and an arc of an outer circumferential circle of the wheel is formed by the circumferential surface. The rotating bodies are rotatably supported on the axis of rotation across the radial direction, and the diameter is gradually reduced from the base end portion to the tip portion, or once increased, and then reduced to form an outer circumferential circle of the wheel by the circumferential surface.

In accordance with the present invention, the turn in the advancing direction like a caster is unnecessary, the advancing direction of a vehicle can be freely changed diagonally or in the longitudinal direction, and the space between the rotating bodies can be small enough to prevent the interference of the space between the rotating bodies even when the diameter of the wheel is increased so that the step can be easily got over.

When the tip portion of each rotating body penetrates a recessed portion of the counter base end portion, the space between the rotating bodies can be further reduced. An outer circumferential portion of the base end portion formed as the recessed portion of each rotating body is formed as an annular lip which is elastic according to the material of the rotating body, and when an annular stepped portion to allow penetration of the lip of the adjacent rotating body is formed in the tip portion of each rotating body, degradation of the true circularity caused by the space between the rotating bodies, i.e., generation of rattling noises in the rotating mode is suppressed.

If each rotating body is of a half-spindle shape in which the diameter thereof is continuously reduced from the base end portion to the tip portion, the difference in diameter between the forward and rear ends is increased, and the rotating bodies are easily brought close to each other to reduce the space.

Each rotating body comprises a core portion rotatably supported around the axis of rotation and an outer cylindrical portion which surrounds the core portion around the axis of rotation and is a die casting formed of an elastic material, and if protruding and recessed portions which are engaged with each other in a shape-complementary manner by changing the section in the direction of the axis of rotation in protruding and recessed shape are formed on an outer circumferential surface of the core portion and an inner circumferential surface of the outer cylindrical portion, the wall thickness thereof can be limited when they are manufactured of die castings of a synthetic resin or rubber, and as a result, generation of small internal defects specific to the castings can be prevented, and generation of abnormal noises in the traveling mode can be suppressed. In this state, if the core portion and the outer cylindrical portion are formed of a synthetic resin such as a polyurethane, and engaging surfaces of the protruding and recessed portions are adhered to each other, an appropriate elasticity to suppress the vibration is realized to easily and reliably enable the engagement. When the core portion is formed of a metal, generation of small internal defects in the die casting of the outer cylindrical portion can be avoided.

When a bearing arm with the base end portion mounted on the rim penetrates into a space between the tip portion of the rotating body and the recessed portion of the adjacent rotating body, the rotating bodies adjacent to each other with a small space therebetween can be rotatably supported with an excellent appearance and a simple structure using the arm.

BRIEF DESCRIPTION OF THE DRAWINGS

FIG. 6 is a plane view showing the wheel configuration in which the wheel having rotating bodies shown in FIG. 1 is employed in an automatic traveling vehicle.

DESCRIPTION OF THE PREFERRED EMBODIMENTS

Figure 1:
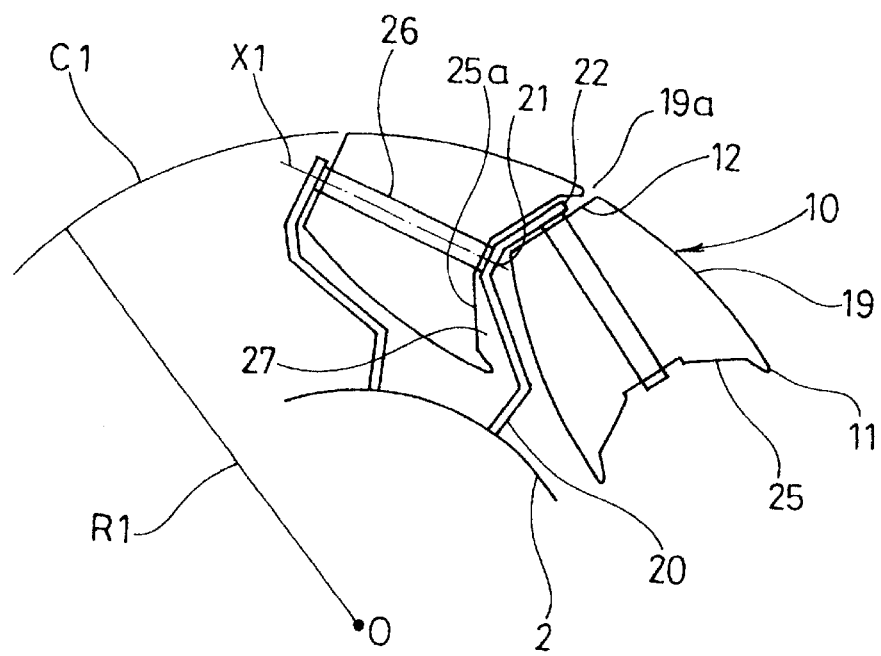
FIG. 1 is a cross-sectional view of a major portion of a wheel having rotating bodies according to the embodiment of the present invention.
Figure 2:
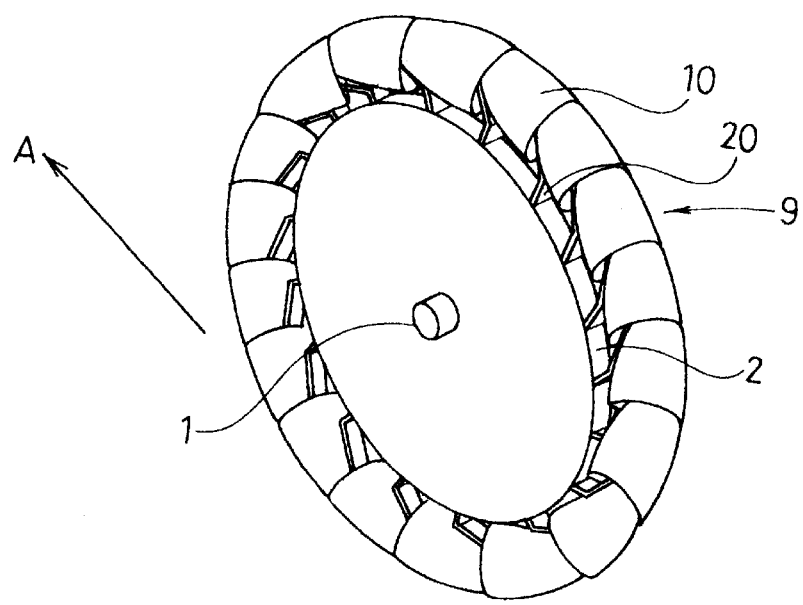
FIG. 2 is a perspective view of the wheel having the rotating body.

A wheel having rotating bodies which are employed in front wheels of four wheels of a wheelchair according to the present invention will be described with reference to FIGS. 1 and 2. A wheel 9 has a diameter so that a step between a sidewalk and a roadway of a road can be easily got over, and a plurality of rotating bodies 10 of the same shape rotating in the direction orthogonal to a straight-ahead direction of the wheel 9 are disposed around a rim 2 having an axle 1 in a center.

Each rotating body 10 is rotatably supported by a shaft 26 located on the same plane as that of the radial circle in the direction of the radius R1 around the axis O of the axle 1 and on the axis X1 of rotation deviated from the plane orthogonal thereto and diagonally thereacross at an angle of deviation. The diameter of each rotating body 10 is continuously reduced from a base end portion 11 to a tip portion 12 along the radius R1, and a circumferential surface 19 forms an arc thereof at the position of rotation to an outer circumferential circle C1 of the wheel 9, and as a result, each rotating body 10 is formed in a half-spindle shape.

The circumferential surface 19 rotating along the outer circumferential circle C1 of the wheel partially penetrates one half of the outer circumferential side of a conical recessed portion 25 formed on the base end portion 11 of the rotating bodies 10 with the tip portions 12 thereof adjacent to each other and is brought close to the base end portions 11 of the adjacent rotating bodies 10 with a space 19a of preferably 1 mm to 5 mm.

In addition, a base end portion of a bearing arm 20 is mounted on a circumferential surface of the rim 2, and penetrates into a space 27 between a circumferential wall 25a on the rim 2 side of a recessed portion 25 and the circumferential surface 19 on the rim 2 side, and further penetrates into a space between the tip portions 12 and successively bent in the direction orthogonal to the adjacent shaft 26. An end on the base end side of the shaft 26 is supported at the middle position 21 of the bearing arm 20, and an end on the tip side of the shaft 26 of the adjacent rotating body 10 is supported at the tip position 22.

The action of the wheel 9 of this configuration employed in front wheels of the wheelchair will be described below. When the wheelchair is pushed in the straight-forward direction A of the wheel 9, the rotating bodies 1—are moved straight forward without rotation. The rotating bodies can be driven in a reverse direction similarly. The entire circumferential surfaces 19 of the rotating bodies 10 can form a substantially continuous outer circumferential circle C1 of the wheel. The space between the forward and rear ends of the rotating bodies 10 is very small so that the rotating action thereof is not interfered with each other, and as a result, no stones are caught in the spaces and a smooth traveling is ensured.

When the wheelchair is pushed in the transverse direction, the rotating bodies 10 in contact with the ground are rotated, and the advancing direction of the wheelchair is changed to the transverse direction. When the wheelchair is pushed diagonally, the wheel 9 is rotated around the axle 1 according to the component of the vector of the advancing force decomposed in the orthogonal direction, and at the same time, the rotating bodies 10 are also rotated around the shaft 26, and the advancing direction of the wheelchair is changed into the diagonally forward direction or the diagonally reversing direction. This means that the wheelchair can be traveled in any direction without increasing the transverse width of the wheel 9 by the non-turn of the rotating bodies 10. The circumferential surface 19 of the rotating bodies 10 is continuous to the outer circumference of the wheel 9 having a sufficient diameter, and as a result, the wheelchair can easily ride over a step or the like on a road surface without any hooking. Since rear wheels of the wheelchair are provided with no rotating bodies 10, the wheelchair gradually changes the advancing direction in the transverse or diagonal traveling process, and is gradually moved into the straight-forward moving condition.

In the above embodiment, the bearing arm 20 is hidden by the rotating bodies 10, and excellent in appearance, it can be supported by the ring-like bearing arm inserted in grooves formed in the circumferential surface of the rotating bodies 10. Further, the rotary shaft on the tip side or the adjacent recessed portion side of the rotating body can be successively and alternately supported in a cantilever manner at the tip position of the radially disposed bearing arms without supporting the rotary shaft on the recessed portion 25 side at the middle position of the bearing arms 20.

Figure 3A:
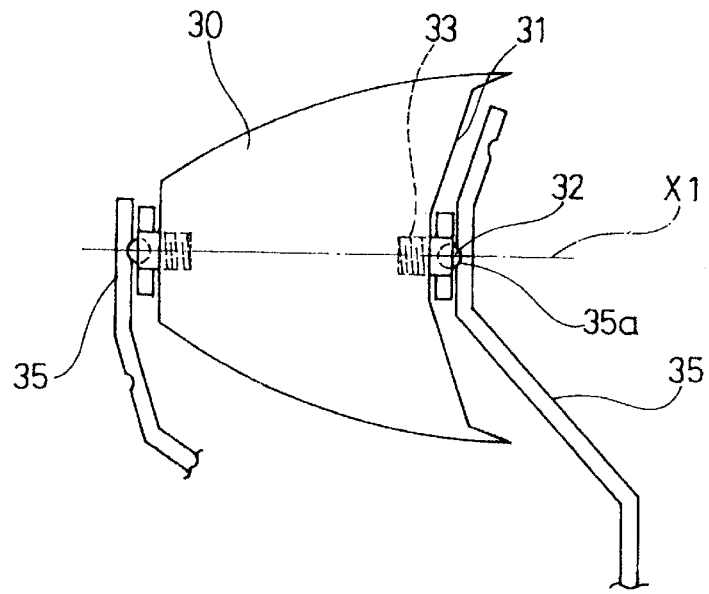
FIG. 3 is a schematic representation of a support structure according to another embodiment of the rotating body.
Figure 3B:
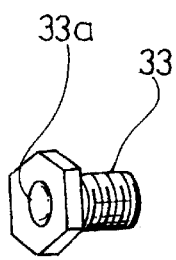
Figure 3C:
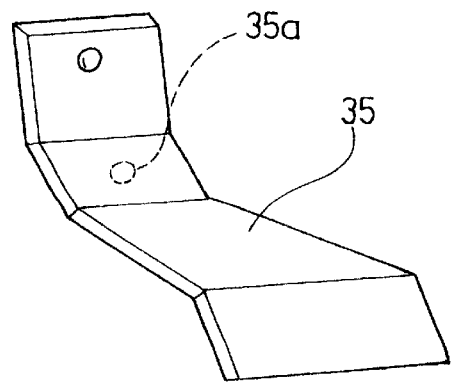

FIG. 3 shows another supporting structure of the rotating body, in place of the above shaft 26, and a bearing bolt 33 (FIG. 3B) having a recessed curved surface 33a receiving a ball 32 is screwed in a base end portion 31 and a tip portion on the axis X1 of rotation of a rotating body 30 as shown in FIG. 3A. This recessed curved surface functions as a rotary recessed portion of the rotating body 30 to be rotatably engaged with the ball 32. On the other hand, a recessed curved surface 35a receiving the ball 32 is formed at the tip position and the middle position of the bearing arm 35 mounted on the rim 2 (FIG. 3C). The bearing arm 35 penetrates into a space between the tip portion of the rotating body 30 and the recessed portion of the adjacent rotating body 30, rotatably supports the rotary recessed portion on the tip side of the rotating body 30 at the tip position via the ball 32, and supports the rotary recessed portion on the recessed portion side of the base end portion 31 of the adjacent rotating body 30 at the middle position.

No recessed portion is formed in the base end portion of the rotating body, and stones or the like are less easily caught by a reduced space between the rotating bodies adjacent to each other compared with simple cylindrical rotating bodies of uniform diameter even when the rotating body is rotatably supported in a cantilever manner by the bearing arm mounted on the rim. In such a case, the base end portion of the rotating body is supported at the middle position in a similar manner to that of the above configuration, and the tip portion can be supported at the extended tip position by extending the bearing arm so that the rotating body is supported on both sides.

Figure 4:
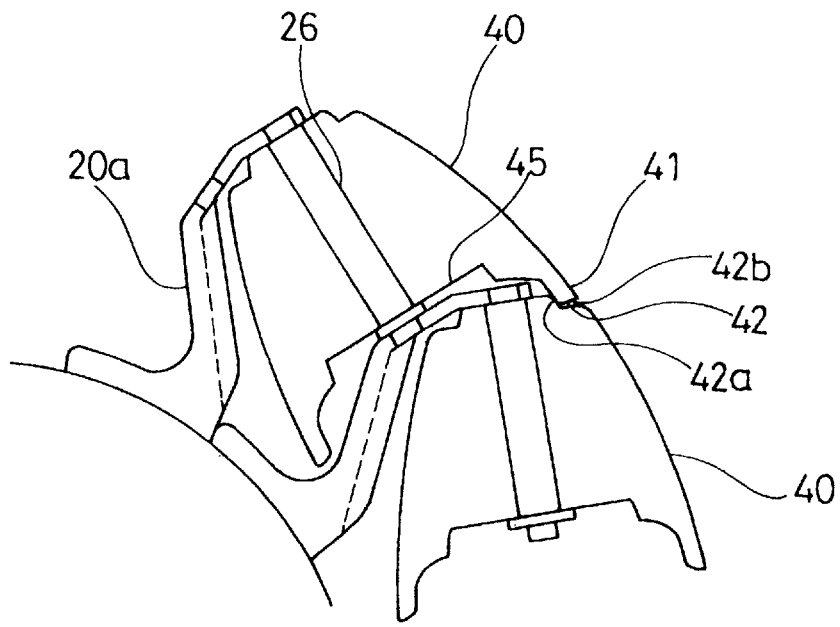
FIG. 4 is a cross-sectional view of the rotating body according to another embodiment.

FIG. 4 shows another embodiment of the rotating body to suppress the vibration in the traveling mode, and similar to the above rotating body 10, each rotating body 40 rotatably mounted on the shaft 26 supported by the bearing arm 20a is formed of a synthetic resin, a recessed portion 45 to allow partial penetration of the adjacent rotating body 40 is formed in the base end portion, and a base end portion of the outer circumference is formed as an annular lip 41 which is elastic according to a material thereof. On the other hand, an annular stepped portion 42 to allow penetration of the lip 41 of the adjacent rotating body 40 is formed on the outer circumferential portion of the tip of each rotating body 40. A stepped surface 42a is reduced in inside diameter in proportion to the thickness of the lip 41, and the width in the longitudinal direction corresponds to a penetration of the lip 41.

The tip of the lip 41 is brought close to a falling surface 42b to eliminate any space between adjacent portions, the true circularity of the wheel is ensured, the tip is restricted by the stepped surface 42a on the lip 41 in the traveling mode, and the deflection of the lip 41 is suppressed. As a result, rattling noise in the traveling mode can be eliminated, and the wheelchair can be moved smoothly, and the ride quality is improved.

Figure 5:
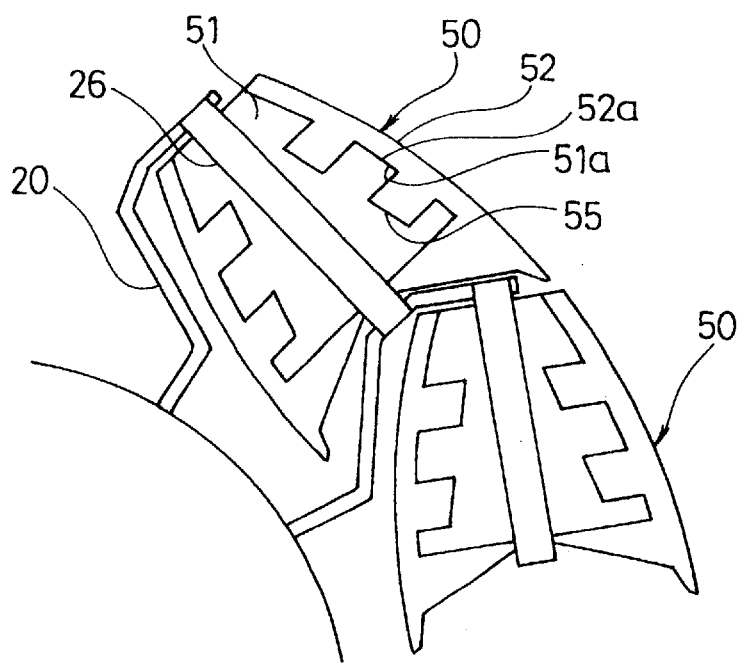
FIG. 5 is a cross-sectional view of the rotating body according to still another embodiment.

FIG. 5 shows still another embodiment when a rotating body is formed of a synthetic resin. A rotating body 50 comprising a core portion 51 with the shaft 26 passed therethrough and an outer cylindrical portion 52 to surround this core portion around the axis of rotation and from a base end side, is manufactured as a separate die casting by the injection molding of a polyurethane which generates no vibration as the wheel and is appropriately elastic. A plurality of stages of protruding and recessed portions 51a and 52a which are engaged with each other in a complementary manner in shape with the section in the direction of the axis of rotation changed in a protruding shape and a recessed shape are formed on an outer circumferential surface of the core portion 51 and an inner circumferential surface of the outer cylindrical portion 52. The outer cylindrical portion 52 is fitted to the core portion 51 making use of each elasticity, and an adhesive is applied to each engaging surface 55 of the protruding and recessed portions 51a and 52a to reliably join both portions with each other.

Generation of abnormal noises in the traveling mode attributable to loose material, blowholes, shrinkage cavity, etc. which can be generated in implementing the integratedly injection molding of the thick-walled rotating body can be avoided. In addition, the dust or water is prevented from entering between the protruding and recessed portions 51a and 52a by joining them with each other, and generation of abnormal noises attributable thereto can be avoided.

In joining these protruding and recessed portions, it is confirmed that a highly reliable adhesion can be realized by bonding the engaging surfaces 55 to each other using a known adhesive which is heated when components thereof are mixed with each other. The die casting is possibly formed of rubber, and the core portion is formed of a metal and pressed, and fitted to the outer cylindrical portion of die casting of a synthetic resin such as urethane or rubber, and in such a case, the wall thickness of the die casting is similarly reduced, and generation of small internal defects can be avoided.

In the above embodiments, the wheel 9 can be employed in rear wheels of the wheelchair. In addition, by providing the rotating bodies on all three or four wheels, the wheelchair can be freely traveled in any direction. When employing the above wheel in every wheel of a four-wheel drive vehicle, front wheels are deflected inside forward each other, and rear wheels are defected inside backward each other as shown in FIG. 6A. Similarly, when employing the above wheel in a three-wheel drive vehicle, the configuration is shown in FIG. 6B, and the vehicle is driven only by front wheels in a straight-forward moving mode.

What is claimed is:

1. A wheel comprising:
   a rim having a center defined by an axis and a plane, said plane being orthogonal to said axis; and
   a plurality of rotating bodies disposed to define an outer circumferential circle about said axis of said rim, each of said rotating bodies having:
      an axis of rotation located within said plane and being supported by said rim to rotate about said axis of rotation;
      a base end portion formed with a recessed portion;
      a tip portion; and
      a circumferential surface defined by a diameter and defining an arc, said arc being a portion of said outer circumferential circle and said diameter at said tip portion being smaller than said diameter at said base end portion,
   wherein said tip portion of each of said rotating bodies partially penetrates said recessed portion of another one of said rotating bodies to define a space.

2. A wheel as defined in claim 1, wherein said space is in a range from about 1 mm to 5 mm.

3. A wheel as defined in claim 1, wherein said recessed portion of each of said rotating bodies is formed as an annular lip, said annular lip being elastic; and
   said tip portion of each of said rotating bodies is formed with an annular stepped portion for penetrating said annular lip.

4. A wheel as defined in claim 1, wherein said diameter of each of said rotating bodies is continuously reduced from said base end portion to said tip portion so that each rotating body has a half-spindle shape.

5. A wheel as defined in claim 1, wherein each of said rotating bodies comprises:
   a core portion having an outer circumferential surface and being rotatably supported around said axis of rotation; and
   an outer cylindrical portion having an inner circumferential surface formed of an elastic material and surrounds said core portion around said axis of rotation;
   wherein said outer circumferential surface and said inner circumferential surface are configured to engage in a shape-complementary manner.

6. A wheel as defined in claim 5, wherein said core portion and said outer cylindrical portion are formed of a synthetic resin, and said outer circumferential surface and said inner circumferential surface are adhered.

7. A wheel as defined in claim 5, wherein said core portion is formed of a metal, and said outer cylindrical portion is formed of a synthetic resin or a rubber.

8. A wheel as defined in claim 1, wherein each of said rotating bodies is supported by a shaft, said shaft being supported by a pair of bearing arms mounted on said rim, each of said bearing arms penetrates into said space between said tip portion of one of said plurality of rotating bodies and said recessed portion of said adjacent rotating body and has a tip position and a middle position, said shaft being supported at said tip position of said bearing arm at said tip portion and at said middle position at said recessed portion of said rotating body.

9. A wheel as defined in claim 1, wherein each of said rotating bodies is supported by a shaft, said shaft being supported by a bearing arm mounted on said rim, said bearing arm penetrates into said space between said tip portion of one of said plurality of rotating bodies and said recessed portion of said adjacent rotating body and has a tip position, said shaft being supported at said tip position.

10. A wheel as defined in claim 1, wherein each of said rotating bodies is supported by a shaft, said shaft being supported by a bearing arm mounted on said rim, said bearing arm penetrates into said space between said tip portion of one of said plurality of rotating bodies and said recessed portion of said adjacent rotating body and has a middle said shaft being supported at said middle position.

11. A wheel having rotating bodies according to claim 1, wherein a bearing arm with said base end portion mounted on said rim penetrates into said space between said tip portion of said rotating body and said recessed portion of said adjacent rotating body, and a rotary recessed portion on said tip portion of said rotating bodies or a rotary recessed portion on said recessed portion side of said rotating bodies adjacent to each other is supported at a tip position of said bearing arm.

* * * * *